(12) United States Patent
Rajewski

(10) Patent No.: US 9,459,821 B2
(45) Date of Patent: Oct. 4, 2016

(54) INTERFACE BETWEEN OUTPUT DEVICE AND TRACKING COMPUTER

(71) Applicant: Paul Wayne Rajewski, Rolling Hills Estates, CA (US)

(72) Inventor: Paul Wayne Rajewski, Rolling Hills Estates, CA (US)

(73) Assignee: U.S. HOSPITALITY PUBLISHERS, INC., Nashville, TN (US)

( * ) Notice: Subject to any disclaimer, the term of this patent is extended or adjusted under 35 U.S.C. 154(b) by 0 days.

(21) Appl. No.: 14/482,982

(22) Filed: Sep. 10, 2014

(65) Prior Publication Data

US 2016/0070519 A1 Mar. 10, 2016

(51) Int. Cl.
G06F 3/12 (2006.01)

(52) U.S. Cl.
CPC .......... *G06F 3/1273* (2013.01); *G06F 3/1272* (2013.01)

(58) Field of Classification Search
CPC ............................ G06F 3/1273; G06F 3/1272
See application file for complete search history.

(56) References Cited

U.S. PATENT DOCUMENTS

| | | |
|---|---|---|
| 5,619,024 A | 4/1997 | Kolls |
| 6,505,095 B1 | 1/2003 | Kolls |
| 6,604,085 B1 | 8/2003 | Kolls |
| 6,712,266 B2 | 3/2004 | Bartley et al. |
| 7,315,824 B2 | 1/2008 | Chen et al. |
| 7,451,921 B2 | 11/2008 | Dowling et al. |
| 7,677,450 B1 | 3/2010 | Rajewski |
| 2001/0037383 A1 | 11/2001 | Sabal |
| 2002/0175208 A1* | 11/2002 | Bartley .................. G06Q 20/28 235/380 |
| 2003/0004886 A1 | 1/2003 | Chandar et al. |
| 2003/0088445 A1 | 5/2003 | Clough et al. |
| 2006/0064580 A1 | 3/2006 | Euchner et al. |
| 2010/0195138 A1* | 8/2010 | DeRoller .............. G06F 3/1203 358/1.15 |

OTHER PUBLICATIONS

ITC Systems Models 1500, 7210, Konica Minolta, product information—Admitted Prior Art, (2 pages).
"CI-1 Serial Interface for Konica Minolta", Product Guide, Boscop, Inc., Konica Minolta, Jun. 2010, (pp. 1-8).
Non-Final Office Action (dated Mar. 10, 2009), U.S. Appl. No. 11/331,483, filed Jan. 13, 2006, First Named Inventor: Paul Wayne Rajewski, 7 pages.

* cited by examiner

*Primary Examiner* — Andrew H Lam
(74) *Attorney, Agent, or Firm* — Blakely, Sokoloff, Taylor & Zafman LLP

(57) ABSTRACT

Methods and systems are described for tracking usage of an output device that is one of a printer, a copier, a fax machine, a scanner, or a multi-function device. According to one embodiment, the output device is connected to a network element that is also separately connected to a network. A tracker computer is also connected to the network. The network element receives status updates from the output device periodically. The network element receives a tracker query from the tracker computer. In response, the network element interprets the last status update and generates a tracker response including an interpreted status of the output device, and transmits the tracker response to the tracker computer. In some embodiments, the network element also allows a user of the output device to identify themselves and pay for their output device usage. Other embodiments are also described and claimed.

19 Claims, 4 Drawing Sheets

INTERFACE BETWEEN OUTPUT DEVICE AND TRACKING COMPUTER

FIELD

The present invention relates to tracking and management of output devices such as printers, copiers, or fax machines. More particularly, the present invention relates to network hardware that connects to an output device and communicates with one or more tracking computers over a network.

BACKGROUND

Some businesses generate profit by charging customers for the ability to use output devices owned by the business. For example, such output devices may include copy machines, printers, fax machines, or multifunction output devices. Such businesses need a reliable way to keep track of each customer's use of the output devices belonging to the business. Typical output devices, however, do not include reliable reporting mechanisms that track each customer's usage independently.

Existing solutions for tracking customer usage of output devices used by such businesses generally represent a trade-off. For example, manning each output device with a staff member produces reliable tracking of each customer's use of each output device, but is slow, inefficient, expensive, and can result in customer privacy issues. On the other hand, customer self-reporting is typically faster and allows the customer privacy, but hinges on an assumption that customers will be honest and not make mistakes, and accordingly holds no guarantee of reliable tracking of output device usage. Both of these solutions also take a hit in terms of reliability from the likelihood of simple human error, either on the part of the customer or on the part of the staff member.

SUMMARY

A system is described that includes an output device, the output device being one of (a) a printer, (b) a fax machine, (c) a copier, (d) a scanner, or (e) a multi-function device whose functionality is some combination thereof. The output device is operable to transmit a status update. The system also includes a tracker computer connected to a network. The tracker computer is to transmit a tracker query through the network, the tracker query requesting an interpreted status of the output device. The tracker computer is also to receive a tracker response over the network, the tracker response including the interpreted status of the output device. The system also includes a network element connected to the network and separately connected to the output device. The network element is operable to receive the status update from the output device and interpret the status update of the output device into the interpreted status of the output device. The network element is further operable to receive the tracker query from the tracker computer. The network element is further operable to generate the tracker response to include the interpreted status of the output device and transmit the tracker response to the tracker computer.

A method that is performed by a network element is described. The network element is connected to a network and is separately connected and to an output device. The output device is one of (a) a printer, (b) a fax machine, (c) a copier, (d) a scanner, or (e) a multi-function device whose functionality is some combination thereof. The method includes receiving a status update from the output device. The method also includes receiving a tracker query from a tracker computer connected to the network. The tracker query requests an interpreted status of the output device. The method also includes interpreting the status update into the interpreted status of the output device and generating a tracker response so that the tracker response includes the interpreted status of the output device. The method also includes transmitting the tracker response to the tracker computer.

A system is described that includes a plurality of output devices. Each output device of the plurality of output devices is one of (a) a printer, (b) a fax machine, (c) a copier, (d) a scanner, or (e) a multi-function device whose functionality is some combination thereof. Each output device of the plurality of output devices is operable to transmit a status update. The system also includes a tracker computer connected to the network. The tracker computer is to transmit a tracker query requesting an interpreted status of a first output device of the plurality of output devices. The tracker computer is also to receive a tracker response including the interpreted status of the first output device. The system also includes a plurality of network elements. Each network element of the plurality of network elements is connected to the network and separately connected to a respective output device of the plurality of output devices. A first network element of the plurality of network elements is connected to the first output device. The first network element is operable to receive the status update from the first output device and interpret the status update into the interpreted status of the first output device. The first network element is further operable to receive the tracker query from the tracker computer. The first network element is further operable to generate the tracker response to include the interpreted status of the first output device. The first network element is further operable to transmit the tracker response to the tracker computer.

A network element is described. The network element includes an interface adapter, the interface adapter operable to connect the network element to an output device. The output device is one of (a) a printer, (b) a fax machine, (c) a copier, (d) a scanner, or (e) a multi-function device whose functionality is some combination thereof. The interface adapter is operable to receive a status update transmitted by the output device. The network element also includes a network adapter. The network adapter is operable to receive a tracker query from a tracker computer. The tracker query requests an interpreted status of the output device. The network adapter is also operable to transmit a tracker response to the tracker computer. The network element also includes a processor connected to the interface adapter and to the network adapter. The processor is operable to execute a network element process. The network element process is operable to (a) receive the status update from the output device through the interface adapter, (b) receive the tracker query from the tracker computer through the network adapter, (c) interpret the status update into the interpreted status of the output device and generate the tracker response so that the tracker response includes the interpreted status of the output device, and (d) transmit the tracker response to the tracker computer through the network adapter.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
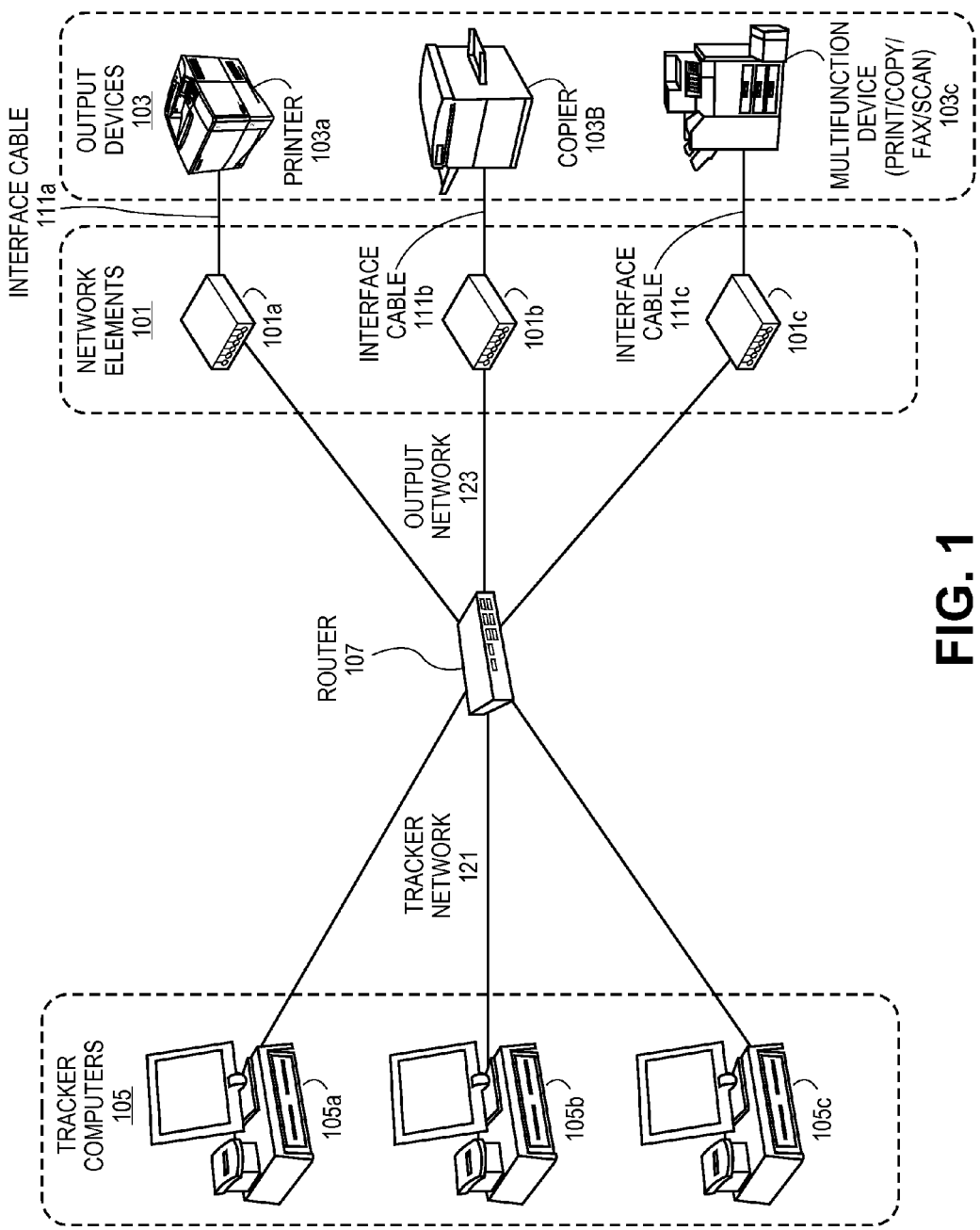
FIG. 1 is a diagram of one embodiment of a subdivided local area network (LAN) that connects tracker computers to network elements, where the network elements are separately connected to output devices.

FIG. 1 is a diagram of one embodiment of a subdivided local area network (LAN) (121, 123) that connects tracker computers 105 to network elements 101, where the network elements 101 are separately connected to output devices 103. In one embodiment, the LAN (121, 123) is subdivided by a router 107, into a tracker network 121 and an output network 123. In one embodiment, the router 107 includes a firewall that only allows particular types of messages to be sent between the tracker computers 105 and the network elements 101, or filters out certain types of messages sent between the tracker computers 105 and the network elements 101. This provides an advantage by protecting the tracker computers 105 from unauthorized access via the output devices 103 or the network elements 101 (e.g., when the output devices 103 or the network elements 101 are accessible to the public but the tracker computers 105 are not). Similarly, it can protect the output devices 103 and the network elements 101 from unauthorized access via the tracker computers 105 (e.g., if the tracker computers 105 are connected to the Internet and are compromised with malware that could affect the network elements 101 or the output devices 103). In other embodiments, the router 107 acts as a simple LAN router and does not provide a firewall feature. In still other embodiments, the router 107 can connect one or both of (a) the tracker computers 105 and (b) the network elements 101 to the Internet. In still other embodiments, the router 107 can be omitted, and the tracker computers 105 can connect directly to the network elements 101.

The networks (121, 123) depicted in FIG. 1 transfer data between the tracker computers 105 and the network elements 101 using any one of a Transmission Control Protocol (TCP), an Internet Protocol (IP), Hypertext Transfer Protocol (HTTP), Hypertext Transfer Protocol Secure (HTTPS), File Transfer Protocol (FTP), Transport Layer Security (TLS), Secure Sockets Layer (SSL), User Datagram Protocol (UDP), Simple Mail Transfer Protocol (SMTP), Wireless Application Protocol (WAP), Bluetooth, some combination thereof, or another appropriate communications or security protocol. In some embodiments, the network (121, 123) may transfer data over Ethernet or other appropriate cables. In other embodiments, the network (121, 123) may transfer data wirelessly as a Wireless Local Area Network (WLAN).

Each output device of the output devices 103 can be one of (a) a printer, (b) a fax machine, (c) a copier, (d) a scanner, or (e) a multi-function device whose functionality is some combination thereof. For example, the embodiment of FIG. 1 illustrates output device 103a as being a printer, output device 103b as being a copier, and output device 103c as being a multifunction device that prints, copies, faxes, and scans. In other embodiments, the number of output devices 103 (and their respective network elements 101) can be lesser or greater than the three pictured in FIG. 1.

Each tracker computer of the set of tracker computers 105 is a computer system. In one embodiment, the tracker computers 105 can be point-of-sale computers in a business that charges customers for usage of output devices 105. In some embodiments, one or more of the tracker computers 105 has a user interface to a human operator, such as a staff member of a business. In some embodiments, as depicted in FIG. 1, there may be multiple tracker computers (e.g., tracker computers 105a-105c) in the set of tracker computers 105. In other embodiments, there may be a single tracking computer in the set of tracker computers 105. Each tracker computer may be any type of computer system. In one embodiment, one of the tracker computers 105 is a point-of-sale computer, such as might be used by a cashier of a store. A tracker computer may include a cash register or a receipt printer in some embodiments. In some embodiments, the tracker computer may include a payment reader device capable of reading a barcode, a quick response (QR) code, a magnetic strip, a passive near field communication (NFC) tag, or an integrated circuit card (ICC). For example, the payment reader device could be used to read and charge a credit card, a debit card, a store-credit gift card, a store membership and account card, a student identification and account card, a staff identification and account card/badge, an ATM card, prepaid card, a bank or credit union account card, an insurance card, a club or group membership and account card, account information displayed on the screen of a personal computing device, or similar objects that can be read or scanned in order to pay for usage of an output device of the set of output devices 103.

In some embodiments, each tracker computer of the set of tracking computers 105 may be a server, such as a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, any other machine with similar functionality. In other embodiments, each tracker computer of the set of tracking computers 105 may be a different type of device, such as a personal computer (e.g., desktops, laptops, and tablets), a virtual machine, a "thin" client, a personal digital assistant (PDA), a Redundant Arrays of Independent Disks (RAID) array, a network-connected appliance, a file server, a network-connected gaming device, a network device, a media player, a mobile phone (e.g., Smartphone), or any other machine with similar capabilities.

In some embodiments, the network elements 101 contain a network adapter (not shown). The network adapter of the network elements 101 allows the network elements 101 to connect to the output network 123. The embodiment of FIG. 1, for example, shows the output network 123 connecting to each of the network elements 101 via a communication link to the router 107. In one embodiment, the communication link is a wired link having an Ethernet cable, and the network adapter of each network element is an Ethernet port and its associated circuitry. In another embodiment, the communication link is a wireless link where the network adapter has an antenna for connecting to a WLAN, an antenna for connecting to a cellular tower network, an antenna for connecting to a satellite network, or another wireless communication connection device.

In some embodiments, the network element 101 also includes an interface adapter (not shown). The interface adapter of the network element 101 allows the network element 101 to connect to an output device 103. Each network element 101 is capable of receiving electronic pulses ("status updates") from its respective output device 103 through the interface adapter. These can be interpreted to generate a useful interpreted status of the output device 103. The embodiment of FIG. 1, for example, shows the network elements 101 connecting to their respective output devices 103 through interface cables (111a, 111b, 111c). In particular, network element 101a connects to printer 103a through interface cable 111a, network element 101b connects to copier 103b through interface cable 111b, and network element 101c connects to multifunction output device 103c through interface cable 111c. In one embodiment, each interface cable connects to its respective output device at a vendor port of the output device. In one embodiment, the interface adapter of each network element could use interchangeable interface cables to account for different types of vendor ports that connect to output devices produced by different manufacturers. In another embodiment, the interface cable and any related circuitry is part of the interface adapter itself, and thus different variations of the network element 101 exist in order to connect to different types of vendor ports included within output devices 103 produced by different manufacturers. In yet other embodiments, the network elements 101 could connect to the output devices 103 in a different manner, such as through a Universal Serial Bus (USB) cable, through a Bluetooth wireless connection, or some other wired or wireless device connectivity method. In one embodiment, one network element of the set of network elements 101 may be incorporated within the body or housing of its respective output device of the set of output devices 103. For example, in one embodiment, network element 101c can be incorporated within the body of multifunction output device 103c.

Figure 2A:
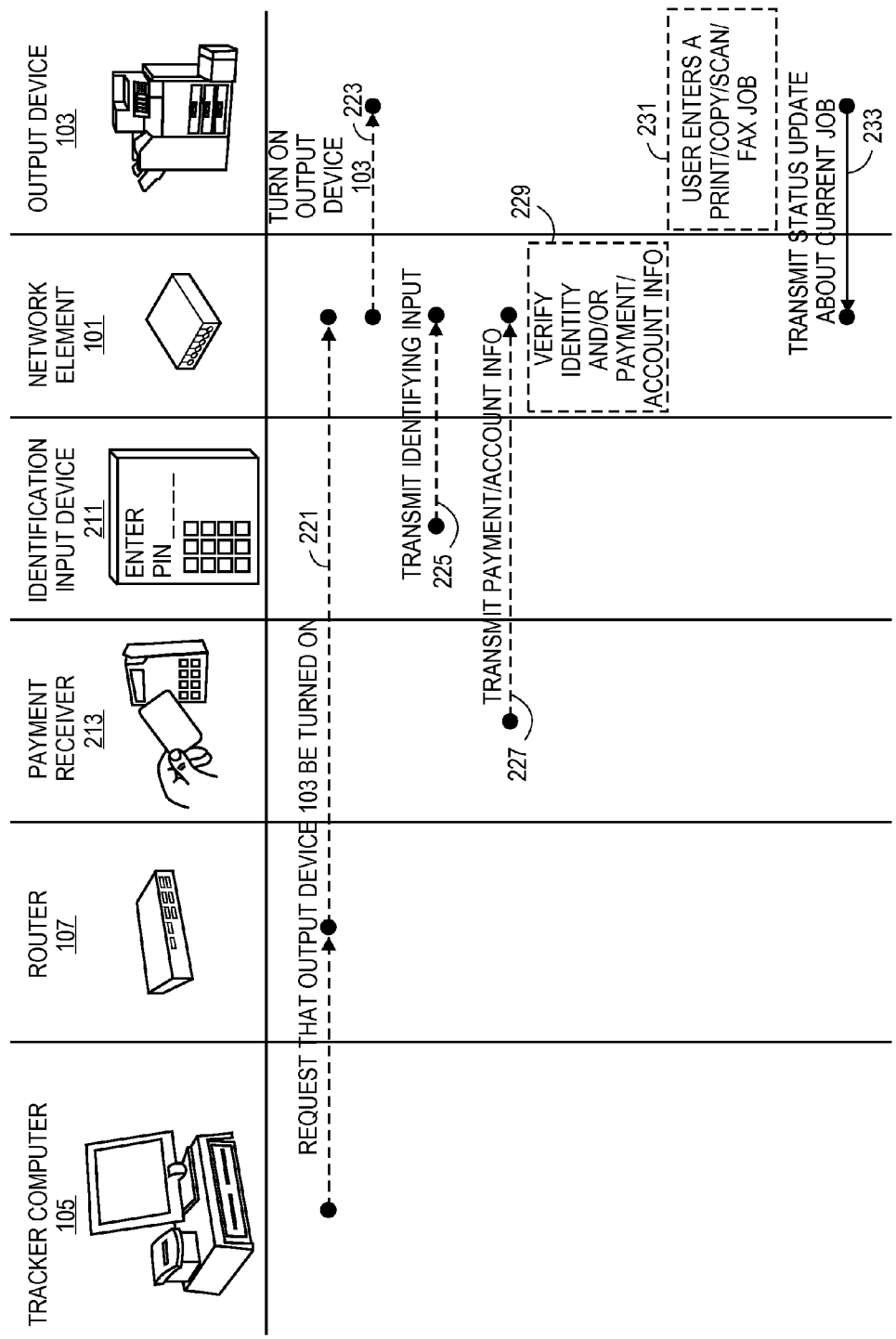
FIG. 2A is the first part of a diagram illustrating one embodiment of a method for tracking and management of an output device.
Figure 2B:
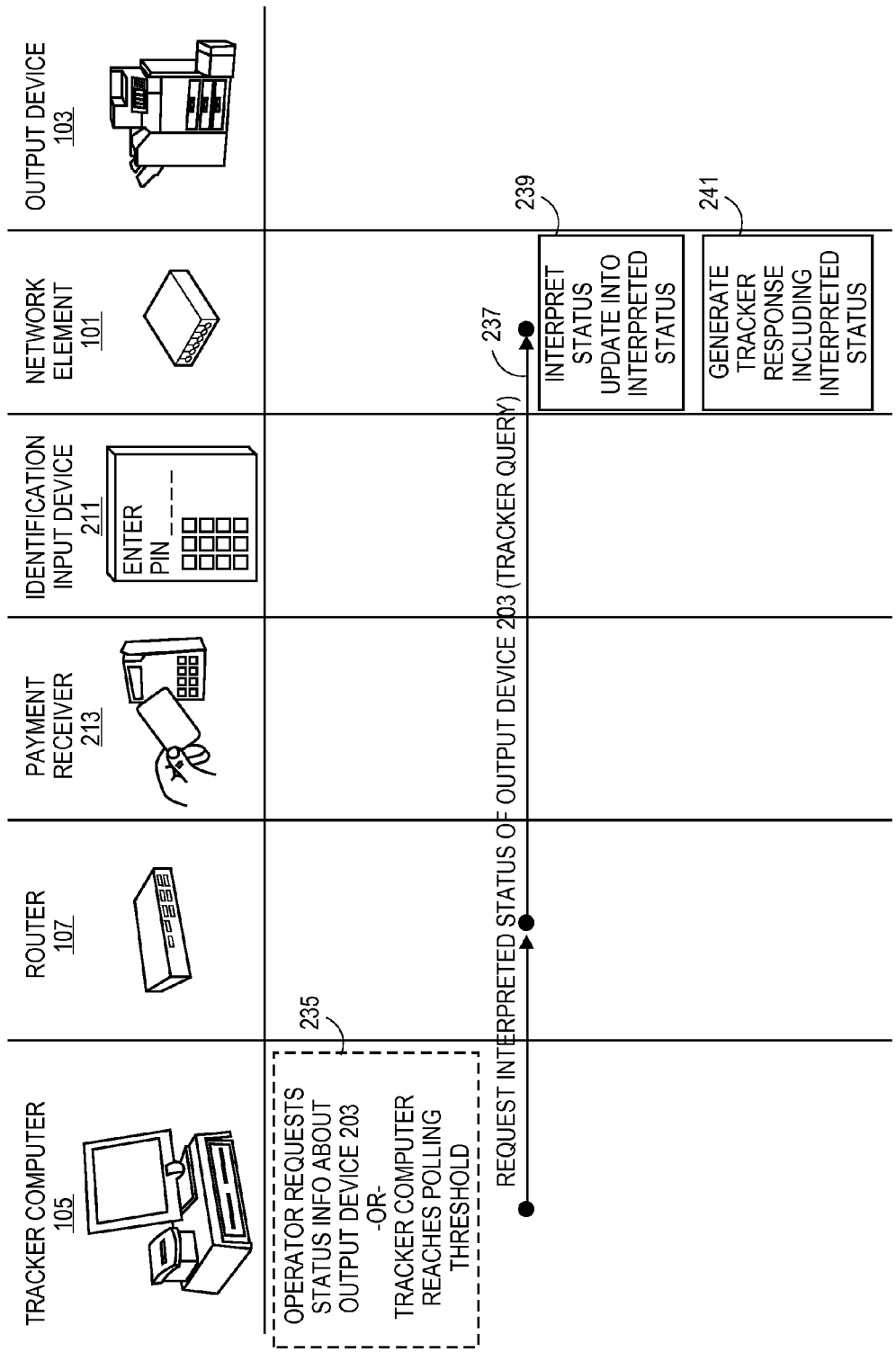
FIG. 2B is the second part of a diagram illustrating one embodiment of a method for tracking and management of an output device.
Figure 2C:
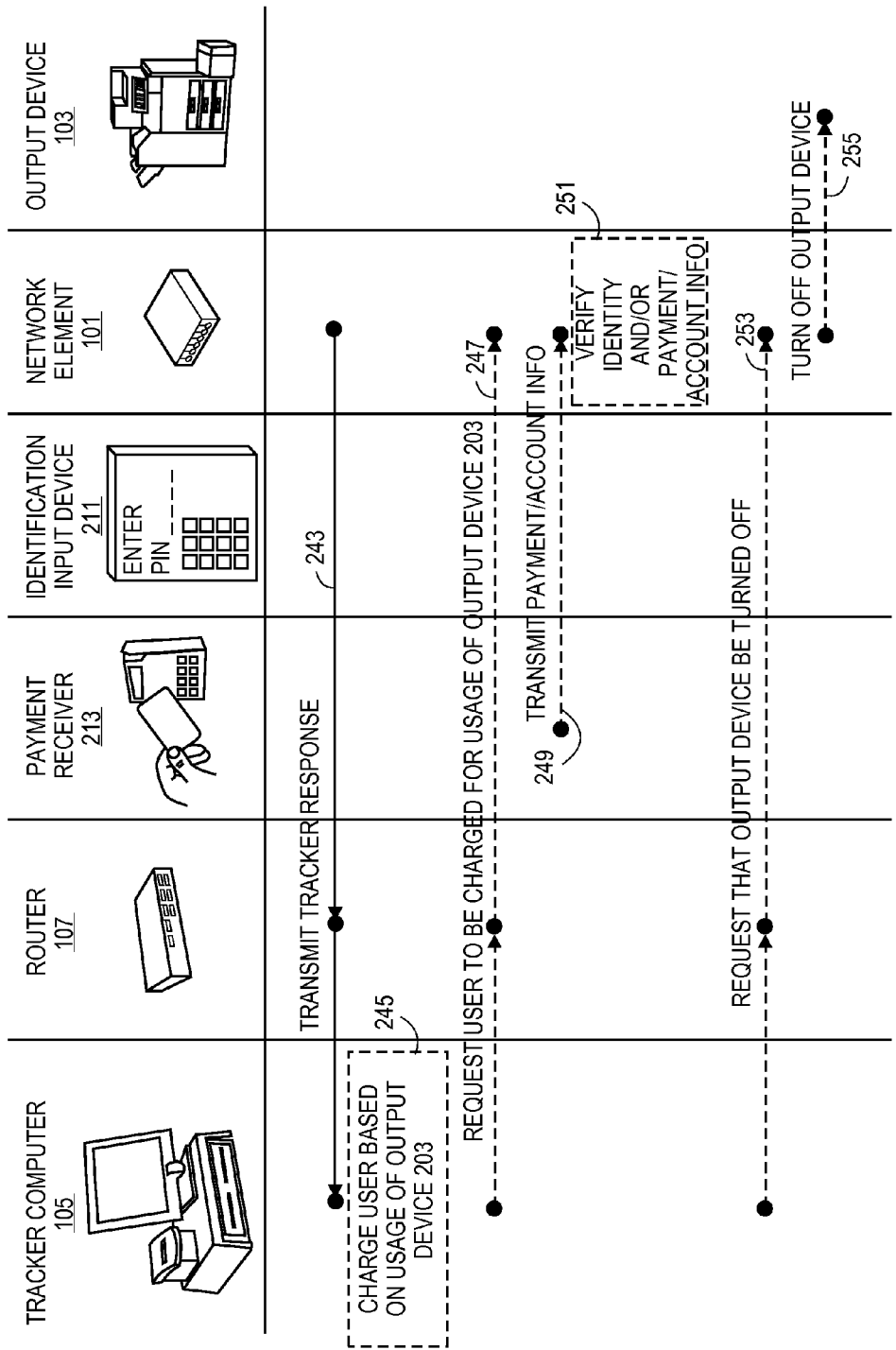
FIG. 2C is the third part of a diagram illustrating one embodiment of a method for tracking and management of an output device.

FIG. 2A, FIG. 2B, and FIG. 2C is a diagram in three parts illustrating one embodiment of a method for tracking and management of an output device. The diagram depicts interactions between a tracker computer 105 and a network element 101 over a router 107. The diagram also depicts an output device 103 connected to the network element 101. The diagram also depicts a payment receiver 213 and an identification input device 211, which may be considered to be part of the network element 101 in some embodiments. As in FIG. 1, one or more other tracker computers, network elements, and output devices may be connected to the router 107, but for the purposes of illustration, only the interaction between one tracker computer 105 and one network element 101 is discussed in this diagram.

In one embodiment, the method illustrated in FIG. 2A includes a tracker computer 105 requesting, through router 107 and to network element 101, that output device 103 be turned on (221). In one embodiment, this could be triggered by an operator of the tracker computer noticing or being told that a potential user wishes to use the output device 103. In another embodiment, this could be an automated process. For example, in one embodiment, the tracker computer can be connected to a motion sensor or pressure sense that could detect a potential user and request that the output device 103 be turned on (in anticipation of its use). In one embodiment, the network element 101 can receive the request (221) and, in turn, turn on (e.g., wake up) the output device 103 through the interface adapter (223).

In some embodiments, the network element 101 serves to authorize usage of the output device 103, using information provided by an identification input device 211. In one embodiment, the identification input device 211 can include (a) a keypad, keyboard, or touchscreen for inputting identifying information. For example, a potential user could enter a personal identification number (PIN) (as illustrated in the icon for the identification input device at the top of FIGS. 2A-2C), a name, a personal email address, a personal phone number, a social security number, a driver's license number, a personal username, a personal customer number, a personal password, or some combination thereof. In one embodiment, the identification input device 211 can include (b) a biometric scanner for verifying biometric signature data. For example, the identification input device 211 could scan a potential user's iris or fingerprint. In one embodiment, the identification input device 211 can include (c) an optical recognition device for verifying an identifying card, an identifying badge, the contents of a display screen of the potential user's personal computing device, or the potential user's face. For example, the optical recognition device could be used to recognize a driver's license, a passport, a student identification card, an automobile registration, a business card, an insurance card, a staff badge, a staff card, a bank card, a store membership card, a group or club membership card, or any other type of card, badge, or document containing information or graphics that can be used to identify a holder of the card. The optical recognition device could be designed to recognize the contents of a display screen of a personal computing device that is displaying a personal identification screen, a bank account screen, a store account screen, or similar screen content that can be used to identify a holder of the personal computing device. In some embodiments, the personal computing device may be a smartphone, a tablet device, a laptop, a smart watch or other wearable device, a personal digital assistant (PDA), an e-book reader device, or a similar electronic device with display capabilities. The optical recognition device could be used to recognize a potential user's face or other visually distinguishable body features. In one embodiment, the identification input device 211 can include (d) a reader device for reading identity information encoded into one of a barcode, a quick response (QR) code, a magnetic strip, a passive near field communication (NFC) tag, or an integrated circuit card (ICC). For example, the reader device could be used to scan one of a credit card, a debit card, a store membership card, a store account card, a store gift card, a club membership card, a group membership card, a student identification card, an insurance card, a staff badge, a staff card, or any other type of card, badge, or document that can be scanned with the reader device and whose scan would produce identifying information. In one embodiment, the identification input device 211 can include a wired or wireless communication interface that is operable to connect to a personal computing device, for purposes of identifying a user of the personal computing device through a process or application program that is running in the personal computing device. For example, a potential user could connect their personal computing device to the network element 101 using such a wired (e.g., a smartphone or tablet device dock) or wireless (e.g., Bluetooth) communication interface and transfer their identifying information directly to the network element 101.

In some embodiments, the identification input device 211 transmits the identifying input (information) to the network element 101, prior to any print, copy, scan, or fax jobs (arrow 225). In one embodiment, the network element 101 prompts the potential user of the output device 103 for this information before the potential user is allowed by the network element 101 to enter a print, copy, scan, or fax job into the output device 103.

In some embodiments, the network element includes a payment receiver 213 used to accept payment through a reader device for reading payment or account information encoded into one of a barcode, a quick response (QR) code, a magnetic strip, a passive near field communication (NFC) tag, or an integrated circuit card (ICC). For example, the reader device could be used to scan one of a credit card, a debit card, a store membership card, a store customer account card, a store gift card, a club or group account card, a student identification account card, an insurance account card, a staff account card or badge, or any other type of card, badge, or document that can be scanned with the reader device and whose scan would allow payment to be charged or would identify information relating to a chargeable account of a potential user. The payment receiver 213 can alternately accept payment through a motorized or non-motorized receptacle for accepting bills, coins, or tokens. The payment receiver 213 can alternately accept payment through a wired or wireless communication mechanism that is operable to connect to a personal computing device running a payment process or application. For example, a payment could be received by the payment receiver 213 from a payment application on a smartphone or tablet device that transfers payment or account information via Near-Field Communications (NFC), Bluetooth, a WLAN communication protocol, infrared light communication, communication through a USB cable or dock, or other similar payment or account communication methods. The payment receiver 213 can alternately accept payment through a keypad, keyboard, or touchscreen for inputting account information. For example, the keypad, keyboard, or touchscreen could be used to receive a bank account number, a store account number, a personal customer number, a credit card number, a debit card number, a personal username, a personal password, or some combination thereof, so that the given account can be charged. The payment receiver 213 can alternately accept payment through a physical or network connection to a database stored in a memory, the database containing account information, in response to receiving the identity information of a user. For example, if the identification input device 211 was used to identify the potential user in some way, the physical or network connection could be used to access the database and retrieve information identifying a bank account, a store credit account, a credit card account, a debit card account, or similar account information relating to the identified potential user.

In some embodiments, the payment receiver 213 transmits payment or account information to the network element 101, prior to any print, copy, scan, or fax jobs being performed for the user by the output device 103 (arrow 227). In one embodiment, the network element prompts the potential user of the output device for this information before the potential user is allowed to enter a print, copy, scan, or fax job.

In some embodiments, the network element 101 verifies the identity information provided by the payment receiver 213 prior to any print, copy, scan, or fax jobs being performed (block 229). Additionally, in some embodiments, the network element 101 verifies the payment or account information provided by the payment receiver 213 prior to any print, copy, scan, or fax jobs (block 229). In some embodiments, the network element 202 verifies the identity information and/or the payment or account information by sending a request through the Internet (not shown) to a bank, credit card company, certificate server, or other verifying authority, the request asking the verifying authority to verify the information that the network element 101 has received from the identification input device 211 or the payment receiver 213. In one embodiment, this communication is secured so as to be compliant with the Payment Card Industry (PCI) Data Security Standard (PCI DSS). For example, this communication, as well as its response, may be sent and received using Hypertext Transfer Protocol Secure (HTTPS), Secure File Transfer Protocol (SFTP), Transport Layer Security (TLS), Secure Sockets Layer (SSL), or another appropriate secure communication protocol. In some embodiments, the network element accesses the Internet through the router 107.

The network element 101 can directly signal the output device 103 (e.g., through the latter's vendor port) to be enabled, once it has verified the identity information or payment information. In one embodiment, the method illustrated in FIG. 2A includes a user entering a print, copy, scan, or fax job into the now enabled output device 103 (block 231). In response, the output device 103 may begin a current job and then transmits a status update about the current job (arrow 233). This status update may be an electronic signal output by the output device 103. In some embodiments, this electronic signal is output through the vendor port of the output device 103. In some embodiments, this status update can be interpreted by the network element 101 to obtain information about, for example, a number of pages that the output device has currently output, or is tasked to output, for one of (a) a specific job that the output device has been tasked to perform, (b) an account-centric total of all jobs that the output device has been tasked to perform for a specific account, (c) a user-centric total of all jobs that the output device has been tasked for a specific user, or (d) a time-centric total of all jobs that the output device has been tasked to over a specified period of time.

FIG. 2B is the second part of a diagram illustrating one embodiment of a method for tracking and management of an output device. In some embodiments, the method illustrated in FIG. 2B includes the tracker computer 105 recognizing a need to check status information of the output device 103 (block 235). In one embodiment, this can be triggered by an operator requesting status information about the output device, for example to see how much the user of the output device has already used the output device or has queued the output device to output (block 235). In another embodiment, the tracker computer recognizes a need to check the status information of the output device because it is configured to poll the output device periodically according to a polling threshold, and because the polling threshold has been reached (block 235). The polling threshold can be fairly lengthy (e.g., several minutes) in some embodiments in order to conserve power or network bandwidth. The polling threshold can be short (e.g., less than a second) in other embodiments in order to provide the tracker computer with realtime or near-realtime updates about the status of the output device.

The method illustrated in FIG. 2B includes the tracker computer transmitting a request for an interpreted status of the output device (arrow 237). This request is sometimes referred to as the "tracker query." In some embodiments, the tracker query is transmitted through the router 107.

The method illustrated in FIG. 2B includes interpreting the most recently received status update of the output device 103 into an interpreted status for the output device 103 (block 239). In some embodiments, the interpreted status update can contain information about a number of pages that the output device has currently output, or is tasked to output, for one of (a) a specific job that the output device has been tasked to perform, (b) an account-centric total of all jobs that the output device has been tasked to perform for a specific account, (c) a user-centric total of all jobs that the output device has been tasked for a specific user, or (d) a time-centric total of all jobs that the output device has been tasked to over a specified period of time. In some embodiments, the network element 101 performs this interpretation process (see block 239) when it is requested, as illustrated here in FIG. 2B. In other embodiments, network element 101 performs this interpretation process (see block 239) automatically and immediately after receiving the status update (i.e., immediately after the process described in arrow 233—see FIG. 2A. In one embodiment, the network element additionally requests a new status update from the output device 103 immediately after the status is requested by the tracker computer 105 (i.e., after the process described in arrow 237 but before the process described in block 239) (this embodiment not shown in FIG. 2B).

The method illustrated in FIG. 2B includes generating a tracker response including the interpreted status (block 241). The tracker response is a response to the tracker query (see arrow 237) and is formatted so that the tracker computer 105 will be able to read the tracker response and as a result obtain the information contained in the interpreted status (generated in block 239).

FIG. 2C is the third part of a diagram illustrating one embodiment of a method for tracking and management of an output device. The method illustrated in FIG. 2C includes the network element 101 transmitting the tracker response to the tracker computer (arrow 243). In some embodiments, the tracker response is transmitted through the router 107. In some embodiments, the method illustrated in FIG. 2C then includes the tracker computer charging the user based on usage of the output device (block 245).

In one embodiment, the method illustrated in FIG. 2C includes the tracker computer transmitting a request to the network element 101 requesting that the user be charged, based on usage of the output device (arrow 247). This embodiment is possible if the network element is connected to or includes the payment receiver 213. In this embodiment, the network element instructs the user of the output device to use the payment receiver 213 to enter their payment or account information. In some embodiments, the payment receiver 213 then transmits the payment or account information to the network element (arrow 249). In some embodiments, the network element verifies the payment or account information (block 251). In some embodiments, the network element also verifies previously entered identity information (block 251). In some embodiments, the network element verifies the identity information and/or the payment or account information by sending a request through the Internet to a bank, credit card company, certificate server, or other verifying authority, the request asking the verifying authority to verify the information that the network element has received from the identification input device 211 or from the payment receiver 213. In some embodiments, the verification of payment or account information is performed by the payment receiver 213 itself (not shown). In some embodiments, the verification of identity information is performed by the payment receiver 213 itself (not shown).

In some embodiments, the method illustrated in FIG. 2C includes a shutdown request from the tracker computer 105 to the network element 101 requesting that the output device 103 be turned off (e.g., powered down or put asleep) (arrow 253). In some embodiments, the shutdown request is transmitted through the router 107. A shutdown request can be used, for example, when a user moves away from the output device and it is not anticipated that the output device will be used for some time. In one embodiment, the shutdown request can be sent by an operator of the tracker computer when the output device has been idle for some time. In one embodiment, an operator could use the tracker computer to send out simultaneous shutdown requests to all output devices in the network, such as at the end of a workday or at the close of business. In another embodiment, the tracker computer can automate this process with a timer, and can send a shutdown request to the output device when the output device has not been used for more than a threshold period of time.

In some embodiments, the network element 101 can, upon receiving a shutdown request (see arrow 253), then direct the output device 103 to shut down. In some embodiments, the network element can shut down the output device by transmitting a signal to the output device that indicates to the output device that it should shut itself down.

An embodiment of the invention may be a machine readable medium having stored thereon instructions which program a processor to perform some of the operations described above, e.g. receiving a tracker query requesting an interpreted status of the output device 103 (arrow 237), interpreting the status update into an interpreted status (block 239), generating a tracker response to include the interpreted status (block 241), transmitting the tracker response (arrow 243). In other embodiments, some of these operations might be performed by specific hardware components that contain hardwired logic and other circuitry. Those operations might alternatively be performed by any combination of programmed computer components and custom hardware components.

A machine-readable medium may include any mechanism for storing information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), Redundant Arrays of Independent Disks (RAID), flash memory, magneto-optical memory, holographic memory, memristor-based memory, bubble memory, magnetic drum, memory stick, polyester film tape, smartdisk, thin film memory, zip drive, or similar storage or memory hardware.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements that have similar functionality, but which may optionally also have one or more different characteristics or functions.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that a particular order may be just an example. Alternate embodiments may optionally perform the operations in different order, combine certain operations, overlap certain operations, etc. Many modifications and adaptations may be made to the methods and are contemplated.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A system comprising:
    an output device, the output device being one of (a) a printer, (b) a fax machine, (c) a copier, (d) a scanner, or (e) a multi-function device whose functionality is some combination thereof, the output device operable to transmit a status update;
    a tracker computer connected to a network, wherein the tracker computer is to transmit a first tracker query and a second tracker query through the network, the first tracker query requesting that the output device be turned on, and the second tracker query requesting an interpreted status of the output device, wherein the tracker computer is also to receive a tracker response over the network, the tracker response including the interpreted status of the output device; and
    a network element connected to the network and separately connected to the output device, wherein the network element is operable to receive the status update from the output device and interpret the status update of the output device into the interpreted status of the output device, wherein the network element is further operable to receive the first tracker query from the tracker computer and in response signal the output device to turn on, and wherein the network element is further operable to receive the second tracker query and in response generate the tracker response to include the interpreted status of the output device and transmit the tracker response to the tracker computer; and
    a router connected to the network in between the tracker computer and the network element so that the first and second tracker queries and the tracker response travel through the router,
    wherein the router serves as a firewall or logical divider between two subdivisions of the network, the two subdivisions of the network being a tracker network and an output network, wherein the tracker network connects the router to the tracker computer and one or more additional tracker computers, and the output network connects the router to the network element and one or more additional network elements,
    and wherein the tracker computer is to communicate with the network element, including transmitting the first and second tracker queries and receiving the tracker responses, through the router and using Hypertext Transfer Protocol Secure (HTTPS).

2. The system of claim 1, wherein the interpreted status of the output device includes information regarding a number of pages that the output device has currently output, or is tasked to output, for one of (a) a specific job that the output device has been tasked to perform, (b) an account-centric total of all jobs that the output device has been tasked to perform for a specific account, (c) a user-centric total of all jobs that the output device has been tasked for a specific user, or (d) a time-centric total of all jobs that the output device has been tasked to over a specified period of time.

3. The system of claim 1, wherein the network element is connected to a payment receiver that accepts payment for use of the output device.

4. The system of claim 3, wherein the payment receiver is operable to accept payment through one of (a) a reader device for reading payment or account information encoded into one of a barcode, a quick response (QR) code, a magnetic strip, a passive near field communication (NFC) tag, or an integrated circuit card (ICC), (b) a motorized or non-motorized receptacle for accepting bills, coins, or tokens, (c) a wired or wireless communication mechanism that is operable to connect to a personal computing device running a payment process or application, (d) a keypad, keyboard, or touchscreen for inputting account information, or (e) a physical or network connection to a database stored in a memory, the database containing account information in response receiving the identity information of a user.

5. The system of claim 1, wherein the network element is connected to an identification input device that verifies the identity of a potential user of the output device.

6. The system of claim 5, wherein the identification input device is operable to verify the potential user's identity by one of (a) a keypad, keyboard, or touchscreen for inputting identifying information, (b) biometric scanner for verifying biometric signature data, (c) an optical recognition device for verifying an identifying card, an identifying badge, the contents of a display screen of the potential user's personal computing device, or the potential user's face, (d) a reader device for reading identity information encoded into one of a barcode, a quick response (QR) code, a magnetic strip, a passive near field communication (NFC) tag, or an integrated circuit card (ICC), or (e) a wired or wireless communication mechanism that is operable to connect to a personal computing device capable of identifying a user of the personal computing device through a process or application.

7. The system of claim 1, wherein the network element connects to the output device through an interface cable that connects to a vendor port of the output device, or wherein the network element is integrated within the body of the output device.

8. The system of claim 1, wherein the tracker query contains a computer identifier that identifies a computer being the source of the tracker query, the computer being one of the tracker computer or a secondary tracker computer, and further wherein the network element is operable to read and interpret the computer identifier and transmit the tracker response to the computer identified by the computer identifier.

9. A method performed by a network element, the network element connected to a network and separately connected and to an output device, the output device being one of (a) a printer, (b) a fax machine, (c) a copier, (d) a scanner, or (e) a multi-function device whose functionality is some combination thereof, the method comprising:
  receiving a status update from the output device;
  receiving a first tracker query and a second tracker query from a tracker computer connected to the network, through a router and a firewall and using HTTPS, wherein the first tracker query requests that the output device be turned on and the second tracker query requests an interpreted status of the output device;
  signaling the output device to turn on, in response to the first tracker query;
  interpreting the status update into the interpreted status of the output device;
  generating a tracker response so that the tracker response includes the interpreted status of the output device; and
  transmitting the tracker response to the tracker computer in response to the second tracker query.

10. The method of claim 9, wherein interpreting the status update into the interpreted status of the output device comprises:
  interpreting the status update into information regarding a number of pages that the output device has currently output, or is tasked to output, for one of (a) a specific job that the output device has been tasked to perform, (b) an account-centric total of all jobs that the output device has been tasked to perform for a specific account, (c) a user-centric total of all jobs that the output device has been tasked for a specific user, or (d) a time-centric total of all jobs that the output device has been tasked to over a specified period of time.

11. The method of claim 9, further comprising:
  accepting payment for a use of the output device through a payment receiver connected to the network element.

12. The method of claim 11, wherein accepting payment for the use of the output device comprises:
  accepting payment by one of (a) a reader device for reading payment or account information encoded into one of a barcode, a quick response (QR) code, a magnetic strip, a passive near field communication (NFC) tag, or an integrated circuit card (ICC), (b) a motorized or non-motorized receptacle for accepting bills, coins, or tokens, (c) a wired or wireless communication mechanism that is operable to connect to a personal computing device running a payment process or application, (d) a keypad, keyboard, or touchscreen for inputting account information, or (e) a physical or network connection to a database stored in a memory, the database containing account information in response receiving the identity information of a user.

13. The method of claim 9, further comprising:
  verifying the identity of a potential user of the output device through an identification input device connected to the network element.

14. The method of claim 13, wherein verifying the identity of a potential user of the output device comprises:
  one of (a) a keypad, keyboard, or touchscreen for inputting identifying information, (b) biometric scanner for verifying biometric signature data, (c) an optical recognition device for verifying an identifying card, an identifying badge, the contents of a display screen of the potential user's personal computing device, or the potential user's face, (d) a reader device for reading identity information encoded into one of a barcode, a quick response (QR) code, a magnetic strip, a passive near field communication (NFC) tag, or an integrated circuit card (ICC), or (e) a wired or wireless communication mechanism that is operable to connect to a personal computing device capable of identifying a user of the personal computing device through a process or application.

15. The method of claim 13, further comprising:
  determining whether or not the potential user is permitted to use the output device; and
  determining whether or not the potential user must pay to use the output device.

16. The method of claim 9, wherein receiving a tracker query from a tracker computer includes receiving the tracker query through a firewall located at a router located between the tracker computer and network element, and further wherein transmitting the tracker response to the tracker computer includes transmitting the tracker response through firewall located at the router.

17. The method of claim 9, wherein receiving a status update from the output device includes receiving the status update through an interface cable connected to a vendor port of the output device.

18. A system comprising:
  a tracker computer connected to a network on one side of a firewall, wherein the tracker computer is to transmit a first tracker query and a second tracker query over the network through the firewall using HTTPS, wherein the first tracker query is requesting that a first output device, being one of a plurality of output devices, be turned on, and the second tracker query is requesting an interpreted status of the first output device, wherein the tracker computer is also to receive a tracker response over the network through the firewall using HTTPS that includes the interpreted status of the first output device; and
  a plurality of network elements, wherein each network element of the plurality of network elements is connected to the network on another side of the firewall, and separately connected to a respective output device of the plurality of output devices, wherein a first network element of the plurality of network elements is connected to the first output device, wherein the first network element is operable to signal the first output device to turn on in response to the first tracker query, and receive the status update from the first output device and interpret the status update into the interpreted status of the first output device, wherein the first network element is operable to receive the second tracker query from the tracker computer and in response generate the tracker response to include the interpreted status of the first output device and transmit the tracker response to the tracker computer through the firewall using HTTPS.

19. A network element comprising:

an interface adapter, the interface adapter operable to connect the network element to a vendor port of an output device, wherein the output device is one of (a) a printer, (b) a fax machine, (c) a copier, (d) a scanner, or (e) a multi-function device whose functionality is some combination thereof, and wherein the interface adapter is operable to receive a status update transmitted by the output device through the vendor port;

a network adapter, the network adapter operable to make one or more network connections to a network on one side of a firewall using HTTPS, and to receive a first tracker query and a second tracker query from a tracker computer over the network connections, wherein the first tracker query requests that the output device be turned on, and the second tracker query requests an interpreted status of the output device, the network adapter also operable to transmit a tracker response to the tracker computer over the network connections; and a processor connected to the interface adapter and to the network adapter, the processor operable to execute a network element process to (a) receive the status update from the output device through the interface adapter, (b) receive the first tracker query and the second tracker query from the tracker computer through the network adapter, (b1) signal through the interface adapter that the output device be turned, in response to the first tracker query, (c) interpret the status update into the interpreted status of the output device and generate the tracker response so that the tracker response includes the interpreted status of the output device, and (d) transmit the tracker response to the tracker computer through the network adapter, in response to the second tracker query.

\* \* \* \* \*